United States Patent
Tokairin et al.

(10) Patent No.: US 9,680,349 B2
(45) Date of Patent: Jun. 13, 2017

(54) POWER TOOL WITH SUBSTRATE HAVING APERTURES FOR COOLING COILS AND SWITCHING ELEMENTS

(71) Applicant: HITACHI KOKI CO., LTD., Tokyo (JP)

(72) Inventors: Junichi Tokairin, Ibaraki (JP); Naoki Sato, Ibaraki (JP); Itsushi Ogawa, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 390 days.

(21) Appl. No.: 14/186,001

(22) Filed: Feb. 21, 2014

(65) Prior Publication Data

US 2014/0239751 A1    Aug. 28, 2014

(30) Foreign Application Priority Data

Feb. 27, 2013    (JP) ................................. 2013-037079

(51) Int. Cl.
    *H02K 7/14*    (2006.01)
    *H02K 9/00*    (2006.01)
    *H02K 9/22*    (2006.01)
    *B25F 5/00*    (2006.01)

(52) U.S. Cl.
    CPC ............ *H02K 7/145* (2013.01); *B25F 5/008* (2013.01); *H02K 9/00* (2013.01); *H02K 9/22* (2013.01)

(58) Field of Classification Search
    CPC  H02K 7/145; H02K 9/22; H02K 9/00; H02K 11/33; H02K 11/0073; H02K 11/30; H02K 11/20; H02K 11/00; B25F 5/008

USPC ..................................................... 310/50, 71
    See application file for complete search history.

(56) References Cited

U.S. PATENT DOCUMENTS

| | | | |
|---|---|---|---|
| 2010/0123359 A1* | 5/2010 | Nishikawa | B25B 21/00 310/50 |
| 2011/0171887 A1* | 7/2011 | Tanimoto | B24B 23/028 451/359 |
| 2011/0198952 A1* | 8/2011 | Nakamura | H02K 3/522 310/71 |
| 2011/0227430 A1* | 9/2011 | Omori | B25F 5/00 310/50 |
| 2012/0318549 A1 | 12/2012 | Nagasaka et al. | |
| 2012/0319509 A1 | 12/2012 | Kishima et al. | |
| 2013/0105188 A1* | 5/2013 | Sakamaki | B25F 5/008 173/170 |

(Continued)

FOREIGN PATENT DOCUMENTS

| | | |
|---|---|---|
| JP | 2006-340555 A | 12/2006 |
| JP | 2013-828 A | 1/2013 |

(Continued)

OTHER PUBLICATIONS

Japanese Office Action for the related Japanese Patent Application No. 2013-037079 dated Jul. 8, 2016.

*Primary Examiner* — Naishadh Desai
(74) *Attorney, Agent, or Firm* — Kenealy Vaidya LLP

(57) ABSTRACT

An electric power tool including: a housing; a brushless motor accommodated in the housing; a fan attached to a rotation shaft of the brushless motor; a switching element configured to control the brushless motor; and a substrate on which the switching element is mounted, wherein a first through-hole is provided to a switching element arranged portion of the substrate.

13 Claims, 7 Drawing Sheets

(56) References Cited

U.S. PATENT DOCUMENTS

2013/0257192 A1* 10/2013 Tsuboi .................. H02K 11/33
                                                                                              310/52
2013/0264987 A1* 10/2013 Uchida .................. H02K 7/145
                                                                                              318/495

FOREIGN PATENT DOCUMENTS

| JP | 2013-831 A | 1/2013 |
| JP | 2013-834 A | 1/2013 |

* cited by examiner

POWER TOOL WITH SUBSTRATE HAVING APERTURES FOR COOLING COILS AND SWITCHING ELEMENTS

CROSS-REFERENCE TO RELATED APPLICATIONS

This application claims priority from Japanese Patent Application No. 2013-037079 filed on Feb. 27, 2013, the entire contents of which are incorporated herein by reference.

TECHNICAL FIELD

Aspects of the present invention relates to an electric power tool including a brushless motor as a drive source.

BACKGROUND

Recently, for an electric power tool including a front end tool, such as a drill or a driver, which is driven by a motor to perform a necessary work, a brushless motor is employed. The brushless motor is a motor which does not require a brush (rectification brush) and a commutator. To supply the brushless motor with driving power, a switching element, such as FET, is required. The switching element generates heat since a large current for driving the brushless motor flows therein. For this reason, a technology is known in which a rotation shaft of the brushless motor is provided with a fan to cool the switching element by an air flow created by the fan (see JP-A-2013-000831 (assigned to the applicant)).

SUMMARY

If the electric power tool is continuously used at a high power, a heat generation amount from the switching element for driving the brushless motor increases. Improvement of a cooling efficiency is further demanded to reliably suppress insufficient cooling of the switching element.

Accordingly, an object of the present invention is to provide an electric power tool capable of efficiently cooling a switching element used for a drive control of a brushless motor.

According to an aspect of the present invention, there is provided an electric power tool including: a housing; a brushless motor accommodated in the housing; a fan attached to a rotation shaft of the brushless motor; a switching element configured to control the brushless motor; and a substrate on which the switching element is mounted, wherein a first through-hole is provided to a switching element arranged portion of the substrate.

According to another aspect of the present invention, there is provided an electric power tool including: a housing; a brushless motor accommodated in the housing; a switching element configured to control the brushless motor, the switching element including a body and a heat radiation plate; and a substrate on which the switching element is mounted so that the heat radiation plate contacts with the substrate, wherein a portion of a first surface of the heat radiation plate, which contacts with the substrate, is exposed.

According to another aspect of the present invention, there is provided an electric power tool including: a housing; a brushless motor accommodated in the housing; a switching element configured to control the brushless motor, the switching element including a body and a heat radiation plate; and a substrate on which the switching element is mounted so that the heat radiation plate contacts with the substrate, wherein the substrate includes a first through-hole, and wherein at least a portion of the first through-hole overlaps with the heat radiation plate in a radial direction of the substrate.

Accordingly, an electric power tool, which can efficiently cool the switching element used for the drive control of the brushless motor, can be provided.

DETAILED DESCRIPTION

Figure 1:
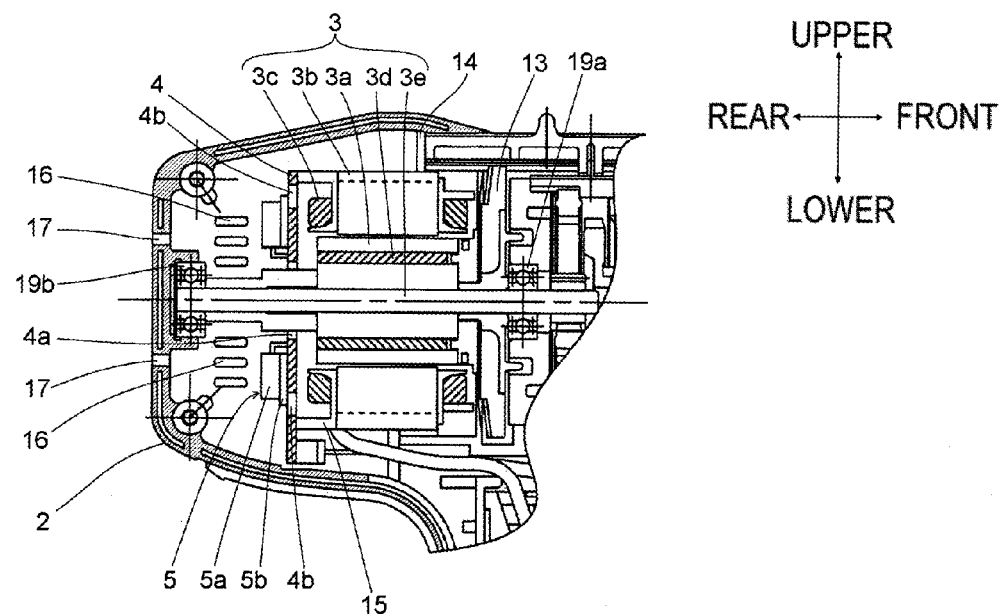
FIG. 1 is a cross-sectional side view illustrating major parts of an electric power tool according to a first embodiment of the present invention.

Hereinafter, description will be made to preferred embodiments of the present invention with reference to the drawings. The same or similar components are denoted by the same reference numerals, and redundant description thereof will be omitted as appropriate. The embodiments will be described for exemplary purposes only, and are by no means intended to restrict the present invention. Also, it is not necessarily essential for the present invention that all the features or a combination thereof be provided as described in the embodiments.

First Embodiment

Figure 2:
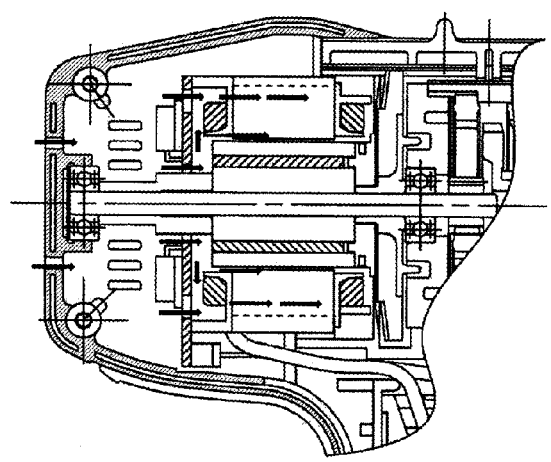
FIG. 2 is a cross-sectional side view illustrating the major parts of the electric power tool in FIG. 1, in which an air flow is indicated by an arrow.
Figure 3:
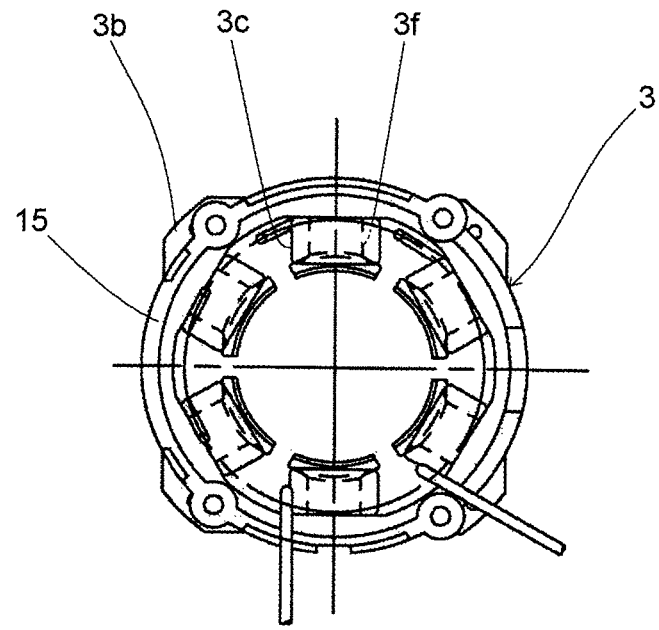
FIG. 3 is a cross-sectional view of a brushless motor 2 of the electric power tool in FIG. 1.
Figure 4:
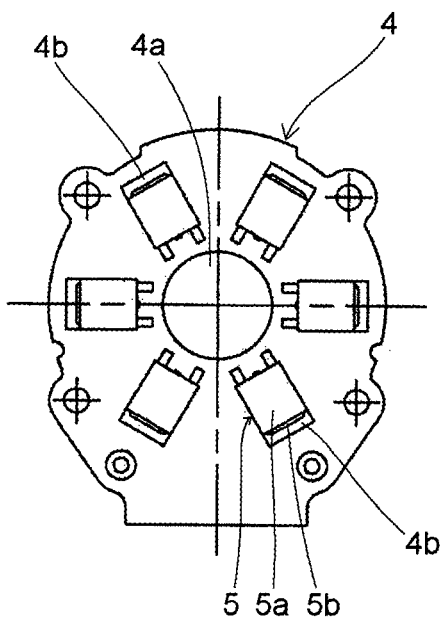
FIG. 4 is a front view of a substrate 4 of the electric power tool in FIG. 1.

FIG. 1 is a cross-sectional side view illustrating major parts of an electric power tool according to the first embodiment of the present invention. FIG. 2 is a cross-sectional side view illustrating the major parts of the electric power tool in FIG. 1 in which an air flow is indicated by an arrow. FIG. 3 is a cross-sectional view of a brushless motor 2 of the electric power tool in FIG. 1. FIG. 4 is a front view of a substrate 4 of the electric power tool in FIG. 1.

The electric power tool according to this embodiment is a drill driver, for example, and includes a brushless motor 3 serving as a drive source. The brushless motor 3 is accommodated in a housing 2. Although the configuration of the brushless motor 3 is well known in the art, one example thereof will be described hereinafter. A rotation shaft 3e of the brushless motor 3 is rotatably supported by bearings 19a and 19b (bearing member) disposed in the housing 2. A rotor core 3a is disposed around the rotation shaft 3e and is rotatable integrally with the rotation shaft 3e. A rotor magnet 3d is inserted into and held by the rotor core 3a. A stator core 3b is disposed (fixed) in the housing 2 to surround a circumference of the rotor core 3a. A stator coil 3c (winding) is provided to the stator core 3b with an insulator 15 being interposed therebetween. A rotor fan 13 is disposed at the front side of the brushless motor 3, and is attached to the same shaft as the rotation shaft 3e to rotate synchronously with the brushless motor 3. A substrate 4 (inverter circuit substrate) is disposed at the rear side of the brushless motor 3.

The substrate 4 is formed in an annular shape having the substantially same diameter as that of the brushless motor 3. The substrate 4 is fixed to the insulator 15 by screw fastening or the like. A plurality of switching elements 5, such as FETs (Field Effect Transistors), are mounted on the substrate 4. The switching element 5 has a body 5a covered by resin or the like, and, a heat radiation plate 5b which is in contact with the body 5a (first heat radiator) and is made of, for example, metal. In this instance, the heat radiation plate 5b may be a portion of the switching element 5, or may be a member separate from the switching element 5. The switching element 5 is a surface mounting type switching element, and is mounted in a state where the body 5a and the heat radiation plate 5b are laid on the substrate 4.

The substrate 4 is provided with a first through-hole 4b (air suction hole) formed to the arranged portion of each switching element 5, as well as a center through-hole 4a through which the rotation shaft 3e of the brushless motor 3 passes. A portion of an opening of the first through-hole 4b is blocked by the heat radiation plate 5b of the switching element 5. As can be seen from FIGS. 3 and 4, the first through-hole 4b is positioned (or extended) between adjacent coil slots 3f when viewed in an axial direction of the brushless motor 3. Further, the first through-hole 4b is provided adjacent to a ventilator window 16 provided to a lateral surface of the housing 2. A ventilator window 17 is provided to a rear surface of the housing 2. A windbreak portion 14 is provided to an inner surface of the housing 2 to reduce or eliminate a gap between the inner surface of the housing 2 and an outer peripheral portion of the brushless motor 3 (outer peripheral portion of the stator core 3b). The windbreak portion 14 may be a rib or protrusion provided on the inner surface of the housing 2, or may be an elastic body, such as sponge or rubber, interposed between the inner surface of the housing 2 and the outer peripheral portion of the stator core 3b.

When the brushless motor 3 is rotated, air is sucked from the ventilator windows 16 and 17 of the housing by rotation of the rotor fan 13 to create air flow passing through the center through-hole 4a and the first through-hole 4b of the substrate 4 (FIG. 2). The air flow flows between the rotor core 3a and the stator core 3b, and between the adjacent coil slots 3f (FIG. 3), and the air is sucked from the rear side of the rotor fan 13 and flows in a radial direction from the rotor fan 13, and is discharged outward from the housing 2 from an air outlet (not illustrated) formed in a portion of the housing around the rotor fan 13.

According to this embodiment, the following effects can be obtained.

(1) Since the first through-hole 4b is provided to the substrate 4, the air flow created by the rotor fan 13 flows adjacent to the switching elements 5 and the heat radiation plate 5b. Therefore, the cooling efficiency of the switching elements can be improved as compared with a case where there is no first through-hole 4b.

(2) Since the first through-hole 4b is interposed between the adjacent coil slots 3f, when seen in the axial direction of the brushless motor 3, the air flow created by the rotor fan 13 easily flows between the coil slots 3f. Therefore, the stator coil 3c can be efficiently cooled.

(3) Since the windbreak portion 14 is provided in the gap between the inner surface of the housing 2 and the outer peripheral portion of the brushless motor 3, the air flow created by the rotor fan 13 concentratively flows on a route extending from the first through-hole 4b and the second through-hole 4c of the substrate 4 to the inside of the brushless motor 3. Therefore, the cooling efficiency of the brushless motor 3 and the switching elements 5 can be improved.

Second Embodiment

Figure 5:
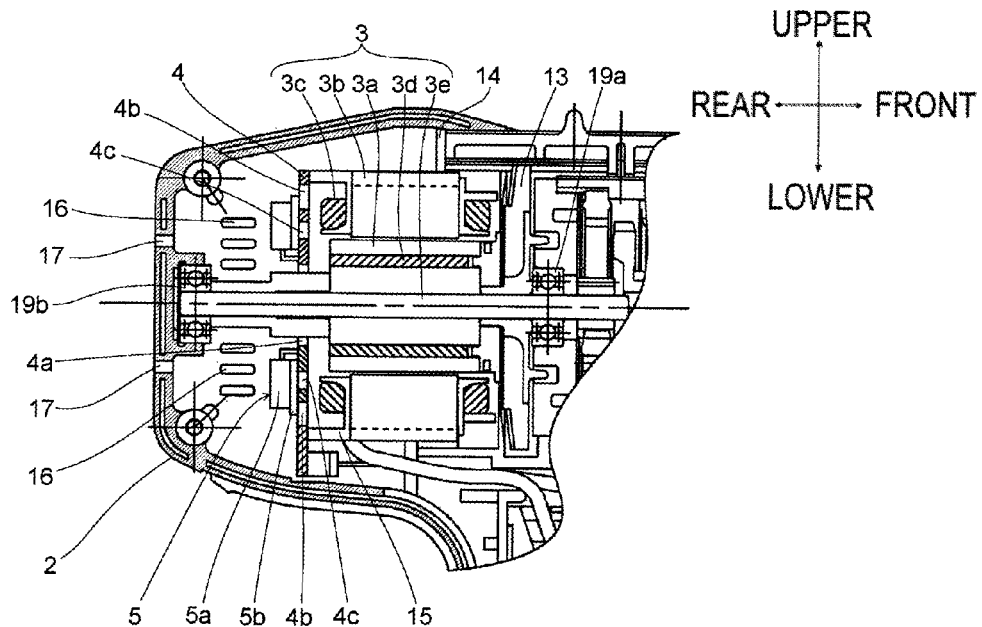
FIG. 5 is a cross-sectional side view illustrating major parts of an electric power tool according to a second embodiment of the present invention.

FIG. 5 is a cross-sectional side view illustrating major parts of an electric power tool according to the second embodiment of the present invention. The electric power tool of this embodiment is substantially identical to that of the first embodiment illustrated in FIG. 1, except for a second through-hole 4c provided to the substrate 4. An opening of the second through-hole 4c is blocked by the heat radiation plate 5b of the switching element 5. According to this embodiment, since the second through-hole 4c is provided, a portion of the heat radiation plate 5b of the switching element 5 is exposed toward a rear surface of the substrate 4. Therefore, a part of the air flow created by the rotor fan 13 (a part of the air flow flowing between the substrate 4 and the brushless motor 3) passes (enters) through the second through-hole 4c, thereby further improving the cooling efficiency of the switching element 5.

Third Embodiment

Figure 6:
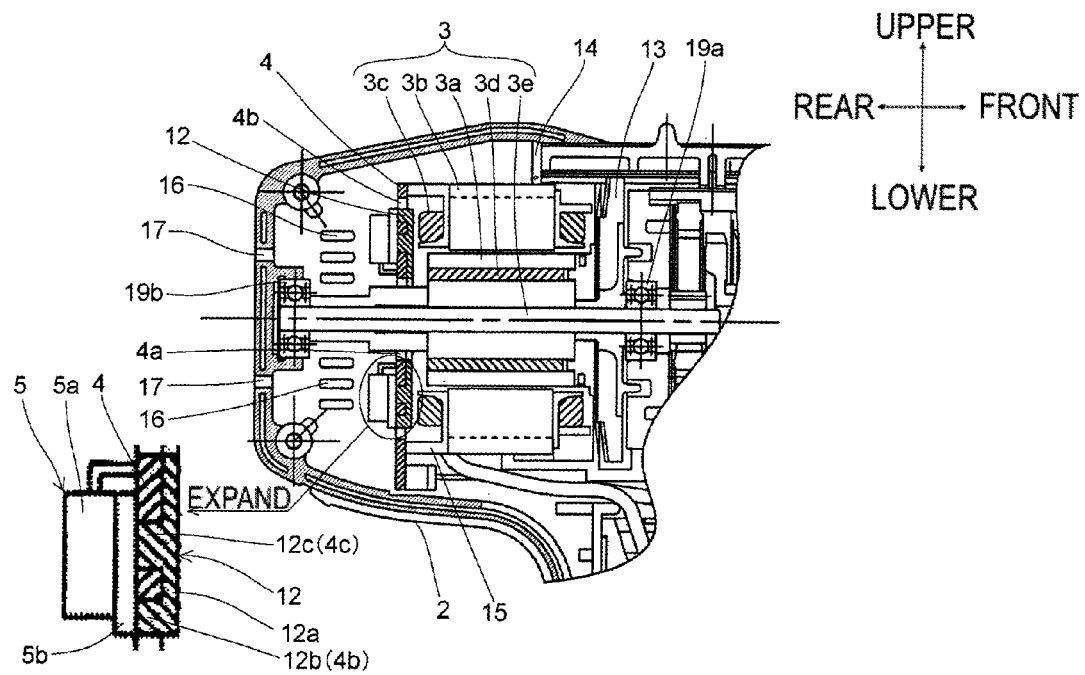
FIG. 6 is a cross-sectional side view illustrating major parts of an electric power tool according to a third embodiment of the present invention.

FIG. 6 is a cross-sectional side view illustrating major parts of an electric power tool according to the third embodiment of the present invention. The electric power tool of this embodiment is substantially identical to that of the second embodiment illustrated in FIG. 5, except that the rear surface (surface opposite to the mounting surface of the switching element 5) of the substrate 4 is provided with, for example, a heat radiation fin 12 (example of the second heat radiator) made of metal. The heat radiation fin 12 includes a substantially circular plate shape base portion 12a through which the rotation shaft 3e of the brushless motor 3 passes, and protrusions 12b, 12c which respectively protrude into the first through-hole 4b and the second-through hole 4c of the substrate 4 and contact with the radiation plate 5b of the radiator 5. According to this embodiment, since the radiation fin 12 is provided, the heat generated from the switching element 5 is transferred to the heat radiation fin 12, and since the heat radiation fin 12 is contacts with the air flow created by the rotor fan 13 by a large area, the cooling efficiency of the switching element 5 can be further improved.

Fourth Embodiment

Figure 7:
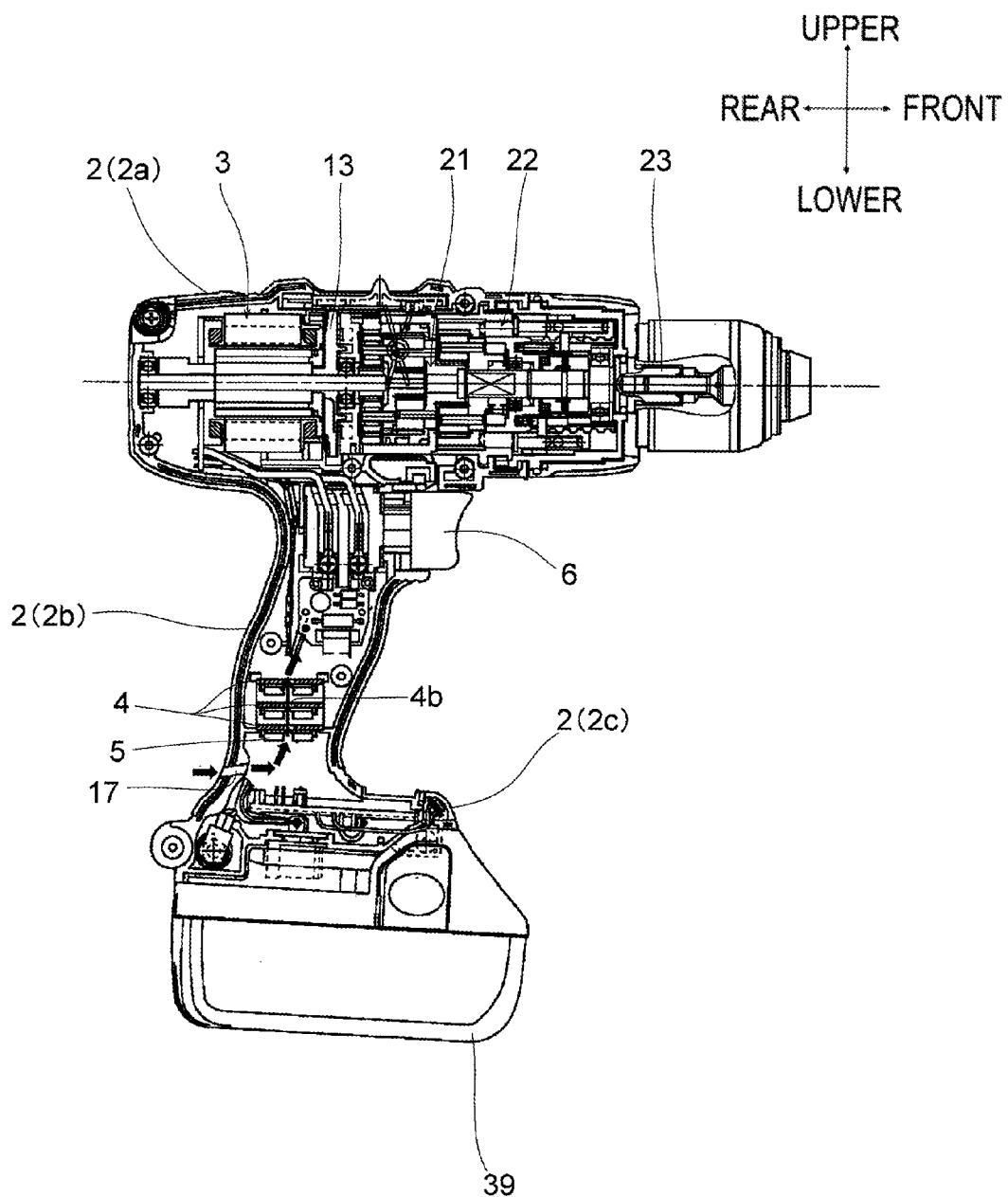
FIG. 7 is a cross-sectional side view of an electric power tool according to a fourth embodiment of the present invention.
Figure 8:
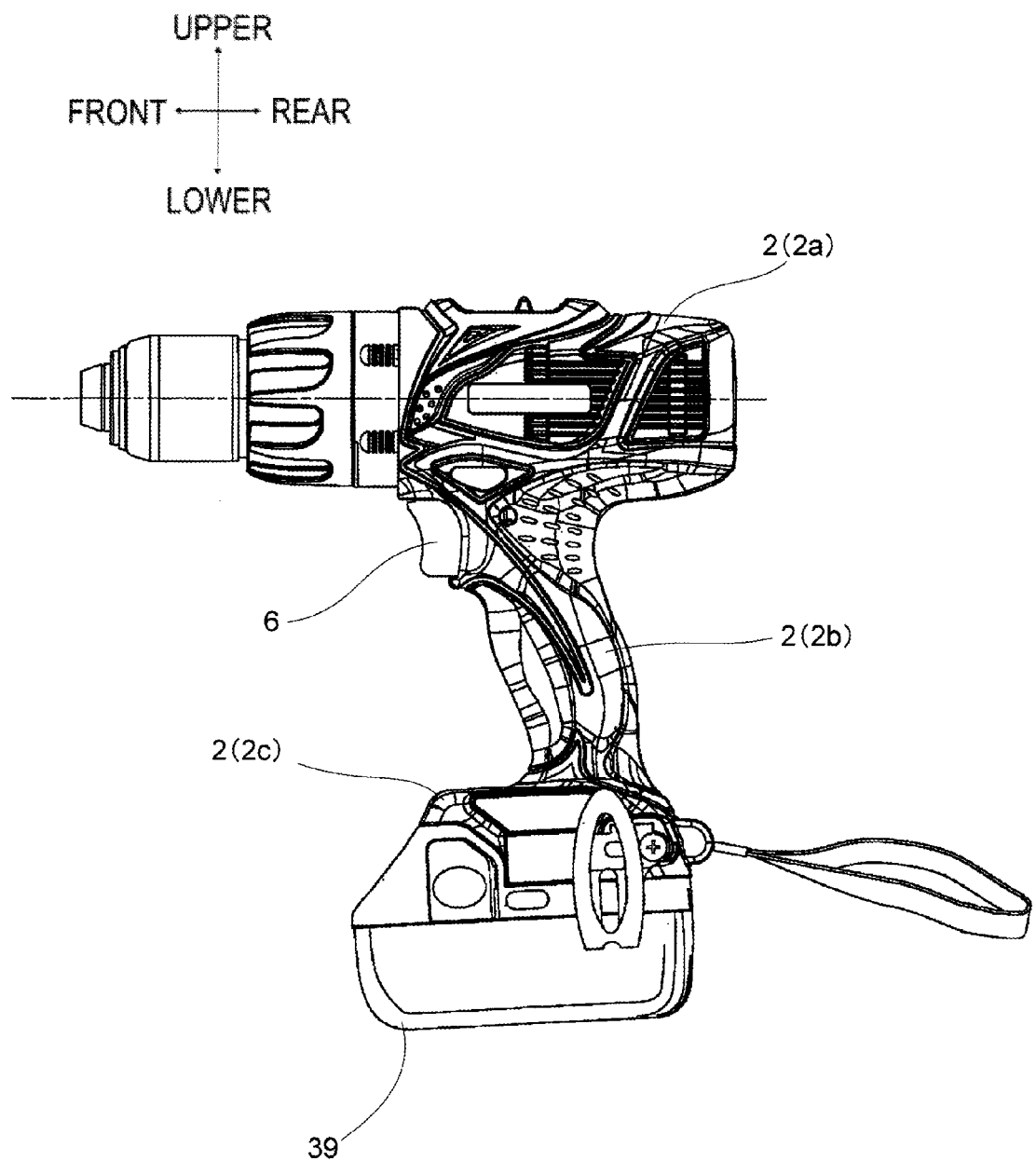
FIG. 8 is an external view of the electric power tool in FIG. 7.

FIG. 7 is a cross-sectional side view of an electric power tool according to the fourth embodiment of the present invention. FIG. 8 is an external view of the electric power tool in FIG. 7. The electric power tool of this embodiment is substantially identical to that of the first embodiment illustrated in FIG. 1, except that the substrate 4 is installed in a handle portion 2b, and the handle portion 2b is provided with the ventilator window 17. Hereinafter, an overall illustrative configuration of the electric power tool will be described together with its difference.

The housing 2 includes a cylindrical power tool body portion 2a, the handle portion 2b extending at substantially right angle from the body portion 2a, and a battery attaching portion 2c below the handle portion 2b. The brushless motor 3 is accommodated in or attached to the power tool body portion 2a. A trigger switch 6 is arranged at an inner upper portion of the handle portion 2b. The battery attaching portion 2c is detachably mounted with a battery 39 consisting of nickel-cadmium battery or a lithium ion battery. The power of the battery 39 is supplied to the brushless motor 3 by manipulation of the trigger switch 6. Rotation of the brushless motor 3 is transferred to a chuck 23 holding the front end tool (not illustrated), such as a driver bit, via a rotary transmission mechanism including a speed reduction part 21 and a clutch mechanism 22. The configuration regarding operation control of the brushless motor 3 and rotation transmission to the chuck 23 is widely known in the art, and thus further description thereof will be omitted herein. In this instance, the overall configuration described above is also common to the first to three embodiments described above.

Inside the handle portion 2b, the substrates 4 are disposed separately in three stages, and the substrate 4 of each stage is provided with the first through-hole 4b. The ventilator window 17 is located below the substrate 4. Even in a case where the substrate 4 is provided in the handle portion 2b, like this embodiment, the switching element 5 can be effectively cooled by providing the substrate 4 with the first through-hole 4b and the handle portion 2b with the ventilator window 17. In this instance, the arrow in the drawing indicates the air flow created by the rotor fan 13, and the air flow is discharged from the air outlet around the rotor fan 13 to the outside of the housing 2.

Although the invention has been described with reference to the above-described embodiments, it can be understood by those skilled in the art that each constituting element or each process can be variously modified within the scope set forth in the claims. Modified embodiment will be described hereinafter.

A heat radiation fin 12 with no protrusion 12c may be additionally provided to the configuration of FIG. 1. In the configuration of FIG. 7, the rear surface of the substrate 4 may be provided with a heat radiation fin. The switching element 5 may be mounted on the substrate 4 in a state in which the switching element 5 is stood, as disclosed in Patent Document 1. The switching element 5 need not have the heat radiation plate 5b. The substrate 4 may be installed in front of the brushless motor 3. The rotor fan 13 may be installed at rear side of the brushless motor 3.

Figure 9:
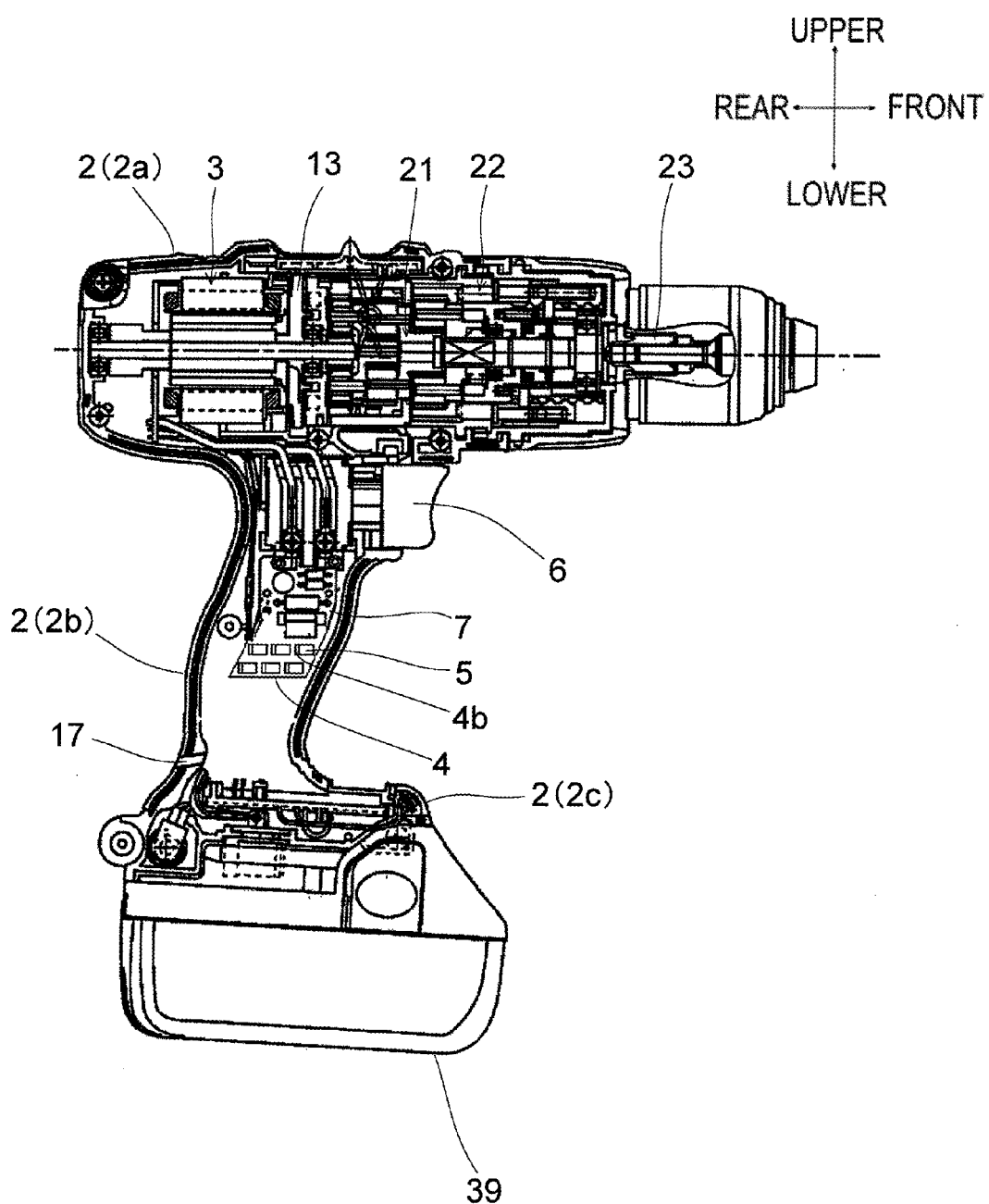
FIG. 9 is a cross-sectional side view of an electric power tool according to a fifth embodiment of the present invention.
Figure 10:
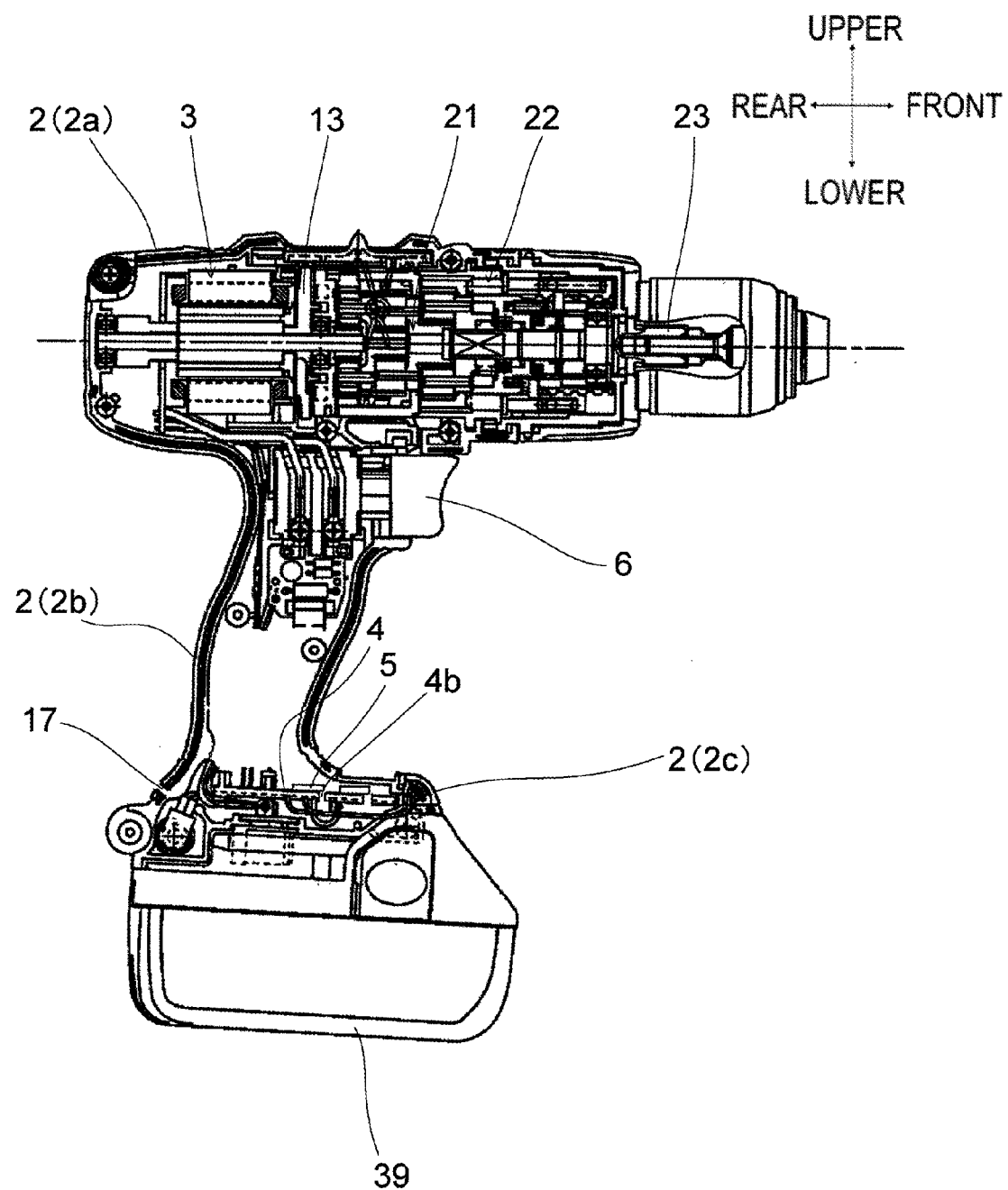
FIG. 10 is a cross-sectional side view of an electric power tool according to a sixth embodiment of the present invention.

In the configuration of FIG. 7, the substrate 4 may be disposed in a longitudinal direction (upper and lower direction in the drawing) of the handle portion 2b. Further, as illustrated in FIG. 9, the switching element 5 (substrate 4) may be integrally provided with a switch substrate 7 of the trigger switch 6. Further, as illustrated in FIG. 10, the substrate 4 may be disposed to the battery attaching portion 2c. In this instance, by also providing the ventilator window 17 to the battery attaching portion 2c, it is possible to effectively cool the switching element 5. That is, by disposing the substrate 4 in a flow passage of the air flow created by the rotation of the rotor fan 13 (between the exhaust port and the ventilator window 17 serving as the suction port), it is possible to effectively cool the switching element 5.

Further, although the windbreak portion 14 is provided in the configuration of FIG. 1, the windbreak portion 14 does not necessarily need to be provided. In this instance, since the air flow created by the rotor fan 13 flows along the outside (between the brushless motor 3 and the housing 2) of the brushless motor 3 as well as the inside of the brushless motor 3, the stator core 3b of the brushless motor 3 can be cooled. In addition, a fan for cooling the switching element 5 (substrate 4) may be separately provided. The electric power tool is not limited to the drill driver described and illustrated in the embodiments, but may be other electric power tool such as an impact driver, as long as it is an electric power tool capable of driving the brushless motor by the switching element.

The present invention provides illustrative, non-limiting aspects as follows:

(1) In a first aspect, there is provided an electric power tool including: a housing; a brushless motor accommodated in the housing; a fan attached to a rotation shaft of the brushless motor; a switching element configured to control the brushless motor; and a substrate on which the switching element is mounted, wherein a first through-hole is provided to a switching element arranged portion of the substrate.

(2) In a second aspect, there is provided the electric power tool according to the first aspect, wherein a portion of an opening of the first through-hole is blocked by the switching element or a first heat radiator which contacts with the switching element.

(3) In a third aspect, there is provided the electric power tool according to the first or second aspect, wherein a ventilator window is provided to the housing, and wherein the first through-hole is provided adjacent to the ventilator window and is configured to suck air.

(4) In a fourth aspect, there is provided the electric power tool according to any one of the first to third aspects, wherein a windbreak portion is provided in a gap between an inner surface of the housing and an outer peripheral portion of the brushless motor.

(5) In a fifth aspect, there is provided the electric power tool according to the fourth aspect, wherein the windbreak portion is a rib or a protrusion which is provided on the inner surface of the housing and protrudes to the gap.

(6) In a sixth aspect, there is provided the electric power tool according to any one of the first to fifth aspects, wherein the substrate is disposed at either of a front side or a rear side of the brushless motor, wherein the brushless motor includes a plurality of coil slots, and wherein, when viewed in an axial direction of the brushless motor, the first through-hole is positioned or extends between adjacent coil slots of the brushless motor.

(7) In a seventh aspect, there is provided the electric power tool according to any one of the first to sixth aspects, wherein a second heat radiator is provided to a rear surface of a switching element arranged surface of the substrate, and wherein the second heat radiator passes thorough the first through-hole and contacts with the switching element or the first heat radiator contacting with the switching element.

(8) In an eighth aspect, there is provided the electric power tool according to any one of the first to sixth aspects, wherein a second through-hole, which has an opening blocked by the switching element or the first heat radiator contacting with the switching element, is provided to the substrate.

(9) In a ninth aspect, there is provided the electric power tool according to the eighth aspect, wherein a second heat radiator is provided to a rear surface of a switching element arranged surface of the substrate, and wherein the second heat radiator passes through the first and second through-holes and contacts with the switching element or the first heat radiator at two locations.

(10) In a tenth aspect, there is provided the electric power tool according to any one of the first to ninth aspects, wherein the switching element is a surface mounting type switching element.

(11) In a eleventh aspect, there is provided the electric power tool according to any one of the first to tenth aspects, wherein a third through-hole, through which the rotation shaft of the brushless motor passes, is provided to the substrate.

(12) In a twelfth aspect, there is provided an electric power tool including: a housing; a brushless motor accommodated in the housing; a switching element configured to control the brushless motor, the switching element including a body and a heat radiation plate; and a substrate on which the switching element is mounted so that the heat radiation plate contacts with the substrate, wherein a portion of a first surface of the heat radiation plate, which contacts with the substrate, is exposed.

(13) In a thirteenth aspect, there is provided the electric power tool according to the twelfth aspect, wherein a first through-hole is provided to the substrate, and wherein the portion of the first surface of the heat radiation plate is exposed through the first-through hole.

(14) In a fourteenth aspect, there is provided the electric power tool including: a housing; a brushless motor accommodated in the housing; a switching element configured to control the brushless motor, the switching element including a body and a heat radiation plate; and a substrate on which the switching element is mounted so that the heat radiation plate contacts with the substrate, wherein the substrate includes a first through-hole, and wherein at least a portion of the first through-hole overlaps with the heat radiation plate in a radial direction of the substrate.

Optional combinations of the aforementioned constituting elements, and modifications of the expressions of the present invention in the form of methods or systems are also effective as aspects of the present invention.

What is claimed is:

1. An electric power tool comprising:
  a housing;
  a brushless motor accommodated in the housing;
  a fan attached to a rotation shaft of the brushless motor;
  a switching element configured to control the brushless motor, the switching element including a body covered by resin; and
  a substrate on which the switching element is mounted,
  wherein a first through-hole is provided to a switching element arranged portion of the substrate at which the body of the switching element is located,
  wherein the substrate is disposed at either of a front side or a rear side of the brushless motor,
  wherein the brushless motor includes a plurality of coil slots, and
  wherein, when viewed in an axial direction of the brushless motor, the first through-hole is positioned or extends between adjacent coil slots of the brushless motor.

2. The electric power tool according to claim 1, wherein a portion of an opening of the first through-hole is blocked by the body of the switching element or a first heat radiator which contacts with the body of the switching element.

3. The electric power tool according to claim 1, wherein a ventilator window is provided to the housing, and
  wherein the first through-hole is provided adjacent to the ventilator window and is configured to suck air.

4. The electric power tool according to claim 1, wherein a windbreak portion is provided in a gap between an inner surface of the housing and an outer peripheral portion of the brushless motor.

5. The electric power tool according to claim 4, wherein the windbreak portion is a rib or a protrusion which is provided on the inner surface of the housing and protrudes to the gap.

6. The electric power tool according to claim 1, wherein a second heat radiator is provided to a rear surface of a switching element arranged surface of the substrate, and
  wherein the second heat radiator passes through the first through-hole and contacts with the body of the switching element or the first heat radiator contacting with the body of the switching element.

7. The electric power tool according to claim 1, wherein a second through-hole, which has an opening blocked by the body of the switching element or the first heat radiator contacting with the body of the switching element, is provided to the substrate.

8. The electric power tool according to claim 7, wherein a second heat radiator is provided to a rear surface of a switching element arranged surface of the substrate, and
  wherein the second heat radiator passes through the first and second through-holes and contacts with the switching element or the first heat radiator at two locations.

9. The electric power tool according to claim 1, wherein the switching element is a surface mounting type switching element.

10. The electric power tool according to claim 1, wherein a third through-hole, through which the rotation shaft of the brushless motor passes, is provided to the substrate.

11. An electric power tool comprising:
  a housing;
  a brushless motor accommodated in the housing;
  a switching element configured to control the brushless motor, the switching element including a body and a heat radiation plate,
  wherein the heat radiation plate includes a first surface that contacts the switching element and a second surface opposite the first surface; and
  a substrate on which the switching element is mounted,
  wherein a first portion of the second surface of the heat radiation plate contacts with the substrate,
  wherein a second portion of the second surface of the heat radiation plate contacts a heat radiation fin such that the heat radiation plate is at least partially sandwiched between the switching element and the heat radiation fin.

12. The electric power tool according to claim 11, wherein a first through-hole is provided to the substrate, and
  wherein the portion of the first surface of the heat radiation plate is exposed through the first-through hole.

13. An electric power tool comprising:
  a housing;
  a brushless motor accommodated in the housing;
  a fan attached to a rotation shaft of the brushless motor;
  a switching element configured to control the brushless motor, the switching element including a body covered by resin; and
  a substrate on which the switching element is mounted, wherein a first through-hole is provided to a switching element arranged portion of the substrate at which the body of the switching element is located, wherein a second heat radiator is provided to a rear surface of a switching element arranged surface of the substrate, and wherein the second heat radiator passes through the first through-hole and contacts with the body of the switching element or a first heat radiator contacting with the body of the switching element.

* * * * *